(12) United States Patent
Gibbons et al.

(10) Patent No.: US 7,936,794 B2
(45) Date of Patent: May 3, 2011

(54) CLOCK MANAGEMENT BETWEEN TWO END POINTS

(75) Inventors: Lee D. Gibbons, Boulder, CO (US); Luke A. Tucker, Beacon Hill (AU); Alexander Scholte, Phegans Bay (AU); Mei-Sing Ong, Forestville (AU)

(73) Assignee: Avaya Inc., Basking Ridge, NJ (US)

( * ) Notice: Subject to any disclaimer, the term of this patent is extended or adjusted under 35 U.S.C. 154(b) by 165 days.

(21) Appl. No.: 11/835,203

(22) Filed: Aug. 7, 2007

(65) Prior Publication Data

US 2009/0041020 A1 Feb. 12, 2009

(51) Int. Cl.
*H04J 3/06* (2006.01)
*H04L 12/28* (2006.01)

(52) U.S. Cl. .................... 370/516; 370/394
(58) Field of Classification Search ............... 370/516, 370/220, 231, 356, 351, 395.62, 464, 498, 370/503, 507, 510, 512, 509
See application file for complete search history.

(56) References Cited

U.S. PATENT DOCUMENTS

| | | | | |
|---|---|---|---|---|
| 5,402,424 A * | 3/1995 | Kou | | 370/324 |
| 5,623,483 A * | 4/1997 | Agrawal et al. | | 370/253 |
| 6,259,677 B1 * | 7/2001 | Jain | | 370/252 |
| 6,327,274 B1 * | 12/2001 | Ravikanth | | 370/516 |
| 6,661,810 B1 * | 12/2003 | Skelly et al. | | 370/516 |
| 6,687,752 B1 * | 2/2004 | Falco et al. | | 709/230 |
| 6,724,736 B1 * | 4/2004 | Azriel | | 370/286 |
| 6,975,655 B2 * | 12/2005 | Fischer et al. | | 370/516 |
| 7,000,031 B2 * | 2/2006 | Fischer et al. | | 709/248 |
| 7,130,368 B1 * | 10/2006 | Aweya et al. | | 375/376 |
| 7,203,858 B2 * | 4/2007 | Loukianov et al. | | 713/400 |
| 7,295,578 B1 * | 11/2007 | Lyle et al. | | 370/503 |
| 7,304,995 B2 * | 12/2007 | Lu et al. | | 370/394 |
| 7,372,875 B2 * | 5/2008 | Hadzic et al. | | 370/516 |
| 7,421,048 B2 * | 9/2008 | Ducharme et al. | | 375/354 |
| 7,545,794 B2 * | 6/2009 | Loukianov | | 370/350 |
| 7,551,647 B2 * | 6/2009 | Fellman et al. | | 370/503 |
| 7,639,716 B2 * | 12/2009 | Murphy et al. | | 370/509 |
| 2002/0163932 A1 * | 11/2002 | Fischer et al. | | 370/465 |
| 2003/0179780 A1 * | 9/2003 | Walker et al. | | 370/508 |

(Continued)

OTHER PUBLICATIONS

"Digital Video Broadcasting (DVB); Specification for the use of Video and Audio Coding in DVB services delivered directly over IP protocols European Broadcasting Union Union Europeenne de Radio-Television EBUUER; ETSI TS 102 005" CEDEX, France, vol. BC, No. V1.3.1, Jul. 1, 2007, XP014037563 ISSN: 0000-0001; pp. 1-49.

(Continued)

*Primary Examiner* — Chi H Pham
*Assistant Examiner* — Robert Lopata
(74) *Attorney, Agent, or Firm* — Sheridan Ross P.C.

(57) ABSTRACT

Clock correlation can be achieved, for example, utilizing the RTP stream between a sender and receiver by determining a baseline at the start of, for example, a communication. This baseline is derived as a point in time from an arriving packet and represents a point from which subsequent packets deviate. Using this baseline, an early packet or a late packet can be detected. An early packet pushes the baseline down to that earlier point, while late arriving packets, if they are arriving late for a continuous period of time, represents a shift in the opposite direction from the baseline, resulting in a baseline moving to the "earliest" packet out of the sequence of the late arriving packets.

23 Claims, 3 Drawing Sheets

U.S. PATENT DOCUMENTS

| | | | |
|---|---|---|---|
| 2004/0062278 A1* | 4/2004 | Hadzic et al. | 370/503 |
| 2004/0258047 A1* | 12/2004 | Miao | 370/352 |
| 2005/0198679 A1* | 9/2005 | Baran et al. | 725/88 |
| 2005/0232151 A1* | 10/2005 | Chapweske et al. | 370/231 |
| 2005/0262537 A1* | 11/2005 | Baran et al. | 725/88 |
| 2005/0265500 A1* | 12/2005 | Miao | 375/354 |
| 2006/0013263 A1 | 1/2006 | Fellman | |
| 2006/0153182 A1* | 7/2006 | Lockridge et al. | 370/389 |
| 2007/0110074 A1* | 5/2007 | Bradley et al. | 370/395.51 |
| 2007/0115814 A1* | 5/2007 | Gerla et al. | 370/230 |
| 2007/0223464 A1* | 9/2007 | Weir et al. | 370/356 |
| 2008/0259966 A1* | 10/2008 | Baird et al. | 370/503 |
| 2008/0279173 A1* | 11/2008 | Zhang et al. | 370/350 |
| 2010/0020829 A1* | 1/2010 | Ruffini | 370/509 |
| 2010/0103922 A1* | 4/2010 | Mosko | 370/350 |

OTHER PUBLICATIONS

Eidson et al., "IEEE 1588™ Standard for a Precision Clock Synchronization Protocol for Networked Measurement and Control Systems" National Institute of Standards and Technology, Aug. 2002, pp. 1-10.

Mills, Simple Network Time Protocol (SNTP), Aug. 1992, University of Delaware, pp. 1-8.

Schulzrinne Columbia University S Casner Packet Design R Frederick Blude Coat Systems Inc V Jacobson Packet Design H: "RTP: A Transport Protocol for Real-Time Applications; rfc3550. txt", IEFT Standard, Internet Engineering Task Force, IETF, CH, Jul. 1, 2003, XP015009332 ISSN: 0000-0003; pp. 1-104.

Schulzrinne, "Network Issues for Multimedia Presentations", May 29, 1997, SYMM Meeting, 14 pages, available at http://www.cs. columbia.edu/IRT/papers/Schu9705_Network.pdf.

Schulzrinne, "Some Frequently Asked Questions about RTP", Columbia University, Nov. 13, 2008, http://www.cs.columbia.edu/~hgs/rtp/faq.html.

European Search Report for European Application No. EP 08007763, mailed Nov. 13, 2008.

Background of the Invention for the above-captioned application (previously provided).

* cited by examiner

CLOCK MANAGEMENT BETWEEN TWO END POINTS

FIELD OF THE INVENTION

An exemplary embodiment of the present invention is directed toward networked devices, services and methods, and more specifically, to clock management between two end points.

BACKGROUND

Devices on a network, such as a packet-switched network, typically run using internal clocks to determine timing information. This means that the sending device's clock and the receiving device's clocked can be unsynchronized. Commonly, these devices transmit data and so the clock rate differences that occur between the different devices does not pose a problem. An arbitrary amount of buffering can be applied and long time-outs can be programmed to ensure that all that is received is stored. However, real-time data, such as voice, fax, video, modem communications, and the like, can be interactive by nature with short time outs and delays. This type of data can benefit greatly by having synchronized clocks between the sender and the receiver.

At the receiver, an internal clock is used to control play-out rate and it is the timing of this clock that should be correlated with the clock of the sending device. For example, in any PC being used as a soft phone, the sound card clock governs the rate of play-out. In an IP telephone, it is the rate at which the A/D and D/A conversion is carried out on the channel. And, for example, in a gateway, the back plane rate is the controlling clock.

The crystals used in such environments can range from accurate to fairly poor. Clock mismatch often results in a need to spill or gain samples periodically to prevent jitter buffer over or underrun in, for example, a voice call. This can affect call quality, albeit in a minor way, while in a modem or fax, call adjustments cannot be carried out as this would cause a modem retrain and potentially a dropped call as the carrier is interrupted. In this example, the jitter buffer continues to build out or shrink resulting in greater delays in one direction which affects time outs. If the call lasts longer, the call ultimately drops when the jitter buffer limit is reached. Bonded video can become distorted depending on where the jitter buffer adjustment is made, or, if none is made, then once the jitter buffer overruns or underruns, a large disturbance in the video can be created.

Related to this issue is lip synchronization in IP video. Due to the timing differences, it is difficult to synchronize voice with the video, making the video a less attractive proposition if it is not dealt with adequately.

Other techniques to solve this problem utilize signal processing techniques such as Kalman filters to extract the long term drift from the short term jitter. This technique is complicated and requires significant processing to maintain. IEEE 1588 sends special frames on request from a device wanting synchronization. The sync source responds with a time stamp. This works on a local LAN with the same subnet.

SUMMARY

Clock synchronization can be achieved, for example, utilizing the RTP stream between a sender and receiver by determining a baseline at the start of, for example, a call. An example of an RTP protocol that can be used with the techniques disclosed herein is described in the IETF RTP Standard (RFC 3550), which is incorporated herein by reference in its entirety. This baseline is derived as a point in time from an arriving packet and represents a point from which every subsequent packet deviates. Using this baseline, an early packet or a late packet can be detected. An early packet pushes the baseline down to that earlier point, while late arriving packets, if they are arriving late for a continuous period of time, represents a shift in the opposite direction from the baseline, resulting in a baseline moving to the "earliest" packet out of the sequence of the late arriving packets.

For example, a period over which packet "lateness" is tested could be around four seconds. This ensures, for example, that lateness due to jitter, from introduced network delays over a period less than four seconds, does not contribute to an invalid baseline shift. The last four seconds can, for example, be evaluated every second for an update to the baseline shift. The four second window, and one second is evaluation period are just examples and both of these values can be made longer or shorter, the trade-off being that more or less memory and possible CPU resources are required.

In accordance with an exemplary embodiment, each baseline shift is recorded and applied to an overall baseline deviation which can be positive or negative. An overall shift which is negative indicates the clock at the receiver is slower than the clock at the sender, while a positive value indicates that the clock at the receiver is faster than the clock at the sender. The length of time from the initial establishment of the baseline to the current point can also be recorded and the ratio of baseline deviation to elapsed time is calculated as the sample drift that is occurring. This exemplary technique removes the short term jitter from the calculation and retains the long term drift.

This ratio can then be used in accordance with an exemplary embodiment to adjust a digital PLL or VCO which drives the synchronous TDM back plane, in a case of a gateway, or in the case of an IP telephone, the A/D and D/A conversion rate can be adjusted.

An exemplary aspect of the invention relates to clock management.

More specifically, an exemplary aspect of the invention relates to calibrating a clock at a sending device to a clock at a receiving device.

Aspects of the invention further relate to compensating for drift in a communications environment.

Still further aspects of the invention relate to adjusting a digital PLL or VCO at a receiving device.

Still further aspects of the invention relate to adjusting a conversion rate at a receiving device based on detected drift.

Still further aspects of the invention relate to utilization of an RTP stream for clock calibration.

Exemplary aspects of the invention also relate to clock synchronization through the use of an RTP stream by determining a baseline at the beginning of communications and adjusting this baseline based on the delta between the first arriving packet and subsequent packets.

Exemplary aspects of the invention also relate to clock synchronization through the use of an RTP stream by determining a baseline at the beginning of communications and shifting this baseline in a positive or negative direction based on the delta between an arriving packet and subsequent packets.

These and other features and advantages of this invention are described in, or are apparent from, the following description of the exemplary embodiments.

The embodiments and configurations herein are neither complete nor exhaustive. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures wherein.

DETAILED DESCRIPTION

Figure 1:
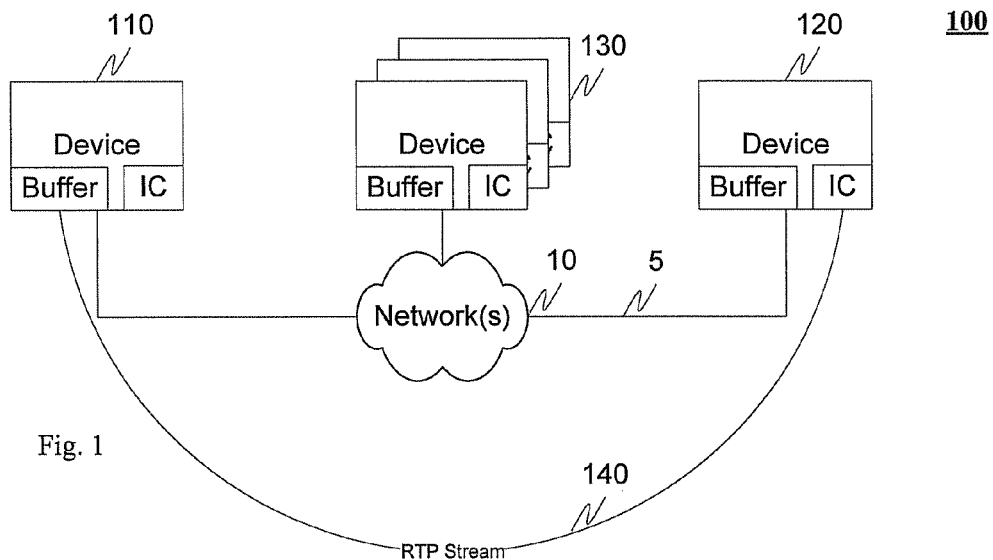
FIG. 1 is a block diagram illustrating an exemplary communications environment that can be used in accordance with this invention.

Exemplary embodiments of this invention will be described in relation to clock adjustment. However, it should be appreciated, that in general, the systems and methods of this invention will work equally well for any type of communication system and any environment, can be used with the exchange of any type of data, and can adjust any type of clock.

The exemplary systems and methods of this invention will also be described in relation to communication systems and associated communication hardware, software and communication channels and networks. However, to avoid unnecessarily obscuring the present invention, the following description well-known structures, network components and devices that may be shown in block diagram form, are well known or are otherwise summarized.

For the purposes of explanation, numerous details are set forth in order to provide a thorough understanding of the present invention. It should be appreciated however that the present invention may be practiced in a variety of ways be on the specific details set forth herein.

Furthermore, while the exemplary embodiments illustrated herein show the various components of the system collocated, it is to be appreciated that the various components of the system can be located at distant portions of a distributed network, such as a communications network and/or the internet, or within a dedicated secure, unsecured and/or encrypted system. Thus, it should be appreciated, that the components of the system can be combined into one or more devices, such as a receiving device, or collocated on a particular node of a distributed network, such as an analog and/or digital communications network, a circuit-switched network and/or a packet-switched network. As will be appreciated from the following description, and for reasons of computational efficiency, the components of the system can be arranged within a distributed network without affecting the operation of the system. For example, the various components can be located in a PBX, a receiving device, or some combination thereof. Similarly, one or more functional portions of the system can be distributed between a communications device and, for example, an associated computing device.

It should also be appreciated that the various links, including any communications channels and links 5 connecting the elements, can be wired or wireless links or any combination thereof, or any other known or later developed element(s) that is capable of supplying and/or communicating data to and from the connected elements. The term module used herein can refer to any known or later developed hardware, software, firmware, or combination thereof that is capable of performing the functionality associated with that element. The terms determine, calculate and compute, and variations thereof as used herein are used interchangeably and include any type of methodology, process, mathematical operation or technique. Furthermore, it is to be noted that the term "a" or "an" entity refers to one or more of that entity. As such, the terms "a" or "an", "one or more" and "at least one" can be used interchangeably herein. It is also to be noted that the terms "comprising," "including" and "having" can be used interchangeably.

Also, while the flow charts are described in relation to a particular sequence of events, it should be appreciated that changes, additions and omissions to this sequence can occur without materially affecting the operation of the invention.

FIG. 1 illustrates an exemplary embodiment of a communications network 100. The communications network 100 comprises a sending device 110, a receiving device 120, and one or more optional additional devices 130, all interconnected by one or more networks 10 and links 5. Between the sending device 110 and the receiving device 120 there is an RTP stream 140. Additionally, each of the devices 110, 120 and 130 can include well known componentry such as a buffer, processor, internal clock (IC), and the like. As discussed in relation to FIG. 2, each of the devices can also include, or be connected to, a clock management module 150.

As will be appreciated, a communication system 100 comprises other well-known components which will not be discussed here in detail. For example, the system 100 can include one or more telephony switch/media servers that can be of any architecture for directing communications to one or more communications devices. Also, the network 10 can, and typically includes proxies, registers, switches and other routers that are well-known. The devices 110, 120 and 130 can be any communication device or device with a clock that is suitable for interfacing to the network to which they are connected or for the purpose of managing the timing of received information. For example, the devices 110, 120 and 130 can be wired or wireless phones, such as an IP hard phone, IP soft phones, personal digital assistants, personal computers, laptops, mobile phones, traditional PSTN type phones, cellular phones, audio and/or video devices, multimedia devices, gaming consoles, etc., or any combination thereof.

A typical communication device can comprise a handset or headset in a cradle assembly. The cradle assembly can comprise a display, a known programmable or hard keypad and programmable or soft keypad.

In operation, and using, for example, the RTP stream as the calibration source ensures a continual update of very accurate calibration information and also does not require any additional protocols to execute in the pursuit of the calibration or synchronization.

Large changes in jitter within an acceptable range such as 500 ms does not affect the accuracy of the clock calibration determination ensuring that the solution works equally well in a WAN as in a LAN or other type of communication network, and in fact, is not dependant upon network properties.

An exemplary solution also handles periods of packet loss without loss of accuracy once the packet transmission resumes. In addition, the timing information can be generated by the appropriate clock, e.g., the A/D converter or TDM clock rather than the processor clock, which may not actively control the rate in which samples are sourced or synced. Exemplary embodiments also allow greater efficiency in terms of processor resources and utilization and are independent of network traffic.

Figure 2:
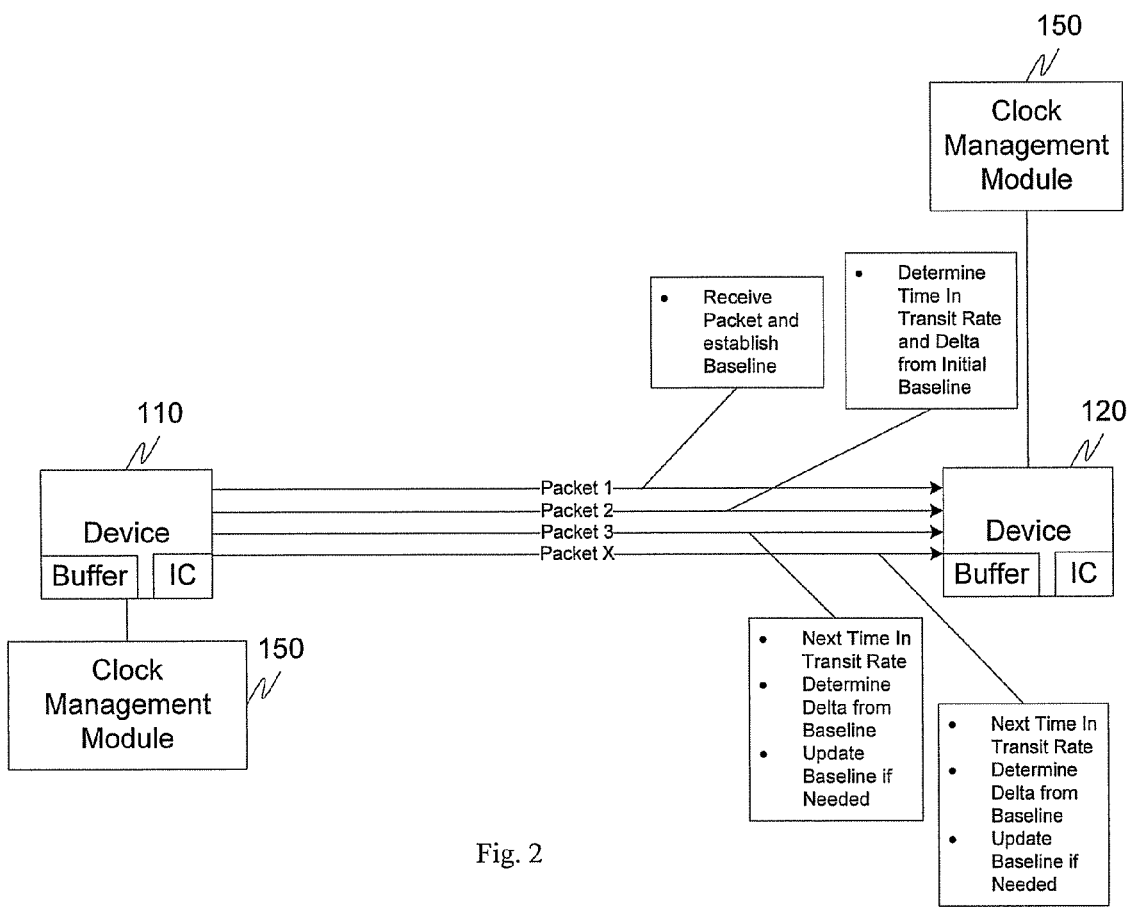
FIG. 2 illustrates an exemplary packet exchange according to this invention.

FIG. 2 illustrates an example of the exchange of packets between the sending device 110 and the receiving device 120, and how the internal clock at the receiving device is adjusted based on a deviation from a baseline. More specifically, the sending device 110 forwards a first packet to the receiving device 120. The first packet is received by the receiving device 120 and a time stamp extracted. This time stamp is utilized to establish an initial baseline. Packet 2 is then forwarded from the sending the device 110 to the receiving device 120 and the deviation from the baseline is determined with the cooperation of the clock management module 150. A determination is then made if the delta is positive or negative. If the delta is negative, the baseline is updated by the negative amount. If the delta is positive, the smallest positive delta in the current window is stored. If there is no change, no action is taken.

The next packet is then received, for example packet 3, and further packets until the window period (if utilized) has elapsed. If the window period has elapsed, a determination is made if the smallest delta is greater than zero. If the smallest delta is greater than zero, the baseline is updated by the positive delta.

The ratio of the baseline deviation to the elapsed time is then determined with the assistance of the clock management module 150 for deltas less than zero, zero, and greater than zero. Then, the local clock at the receiving device 120, for example, a digital PLL, VCO, the conversion rate, such as an A/D or D/A conversion rate, or the like, can be updated so as to calibrate the clock at the receiving device 120 to the clock of the sending device 110.

Figure 3:
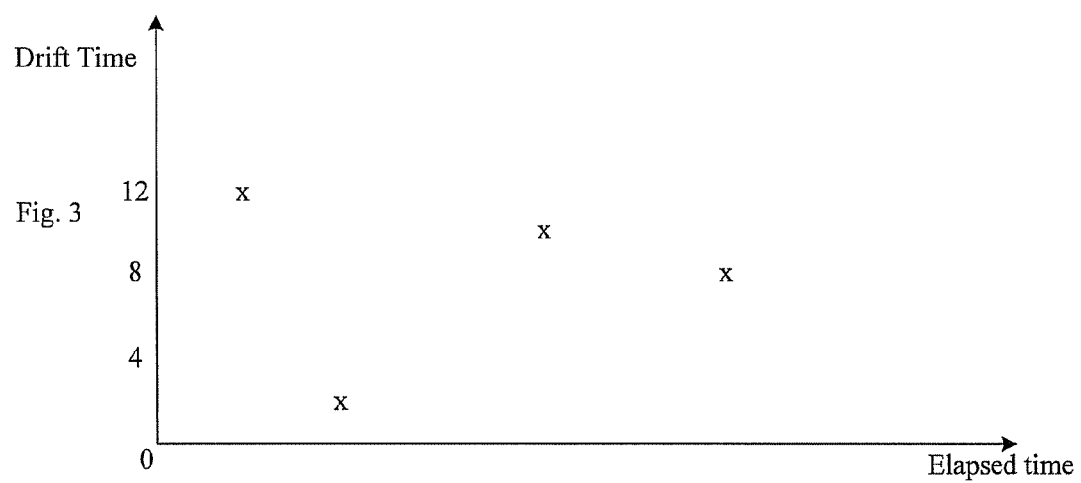
FIGS. 3-5 illustrate the process of adjusting the baseline according to this invention.
Figure 4:
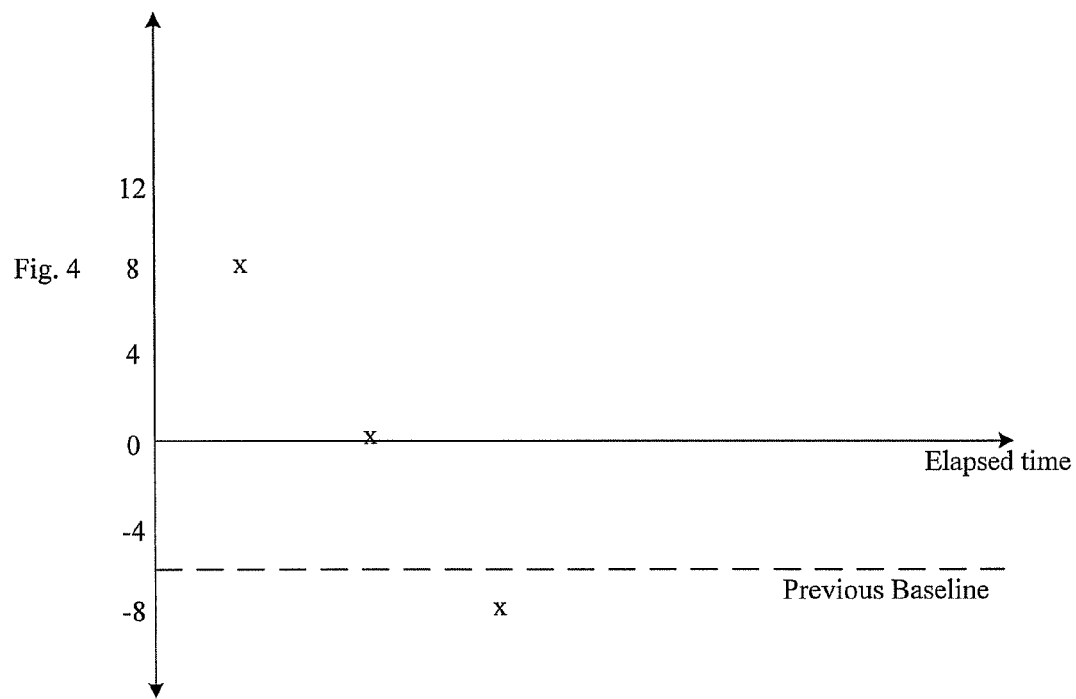
Figure 5:
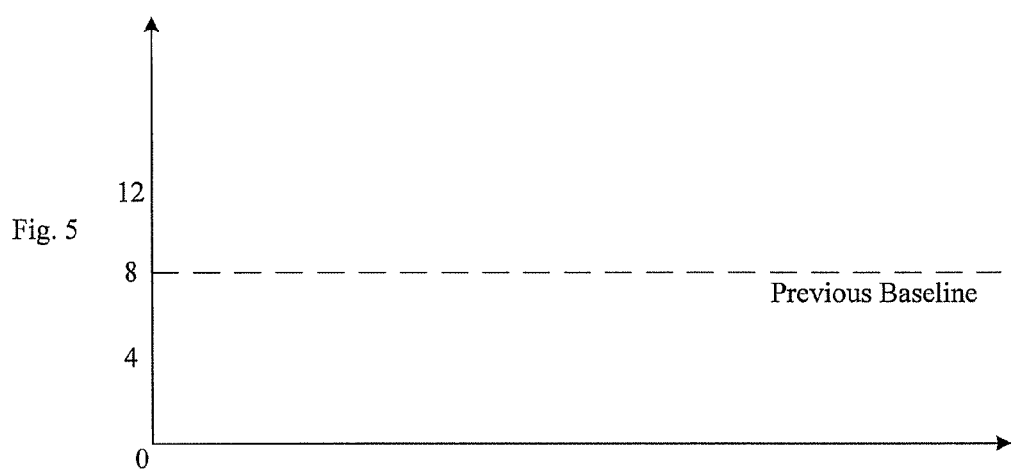

FIGS. 3-5 illustrate exemplary adjustments to a baseline over time. More specifically, FIG. 3 illustrates a graph showing the relationship between drift time and elapsed time where the first packet determines the drift baseline, which is 0. Drift time for each subsequent packet (if the drift is positive) is measured for a window of x seconds with an update performed, for example, every second, however updates can be performed at any time interval. As illustrated in FIG. 3, the drift for subsequent packets is positive ranging from 2 to 12. For negative drift, the updating can occur immediately.

FIG. 4 illustrates a graph of drift time verses elapsed time where the drift baseline has been dynamically shifted to the minimum drift time as now recorded in the previous "window." In this case, it would be six units of time. Drift time for subsequent packets are again measured for a window of x seconds.

If, as illustrated in FIG. 5, a packet arrives earlier than the baseline, the baseline can be immediately readjusted to the drift time of the packet. In this case, the baseline moves −8 units from the previous baseline. The absolute baseline difference from the start of the measurement is now −2 units.

Figure 6:
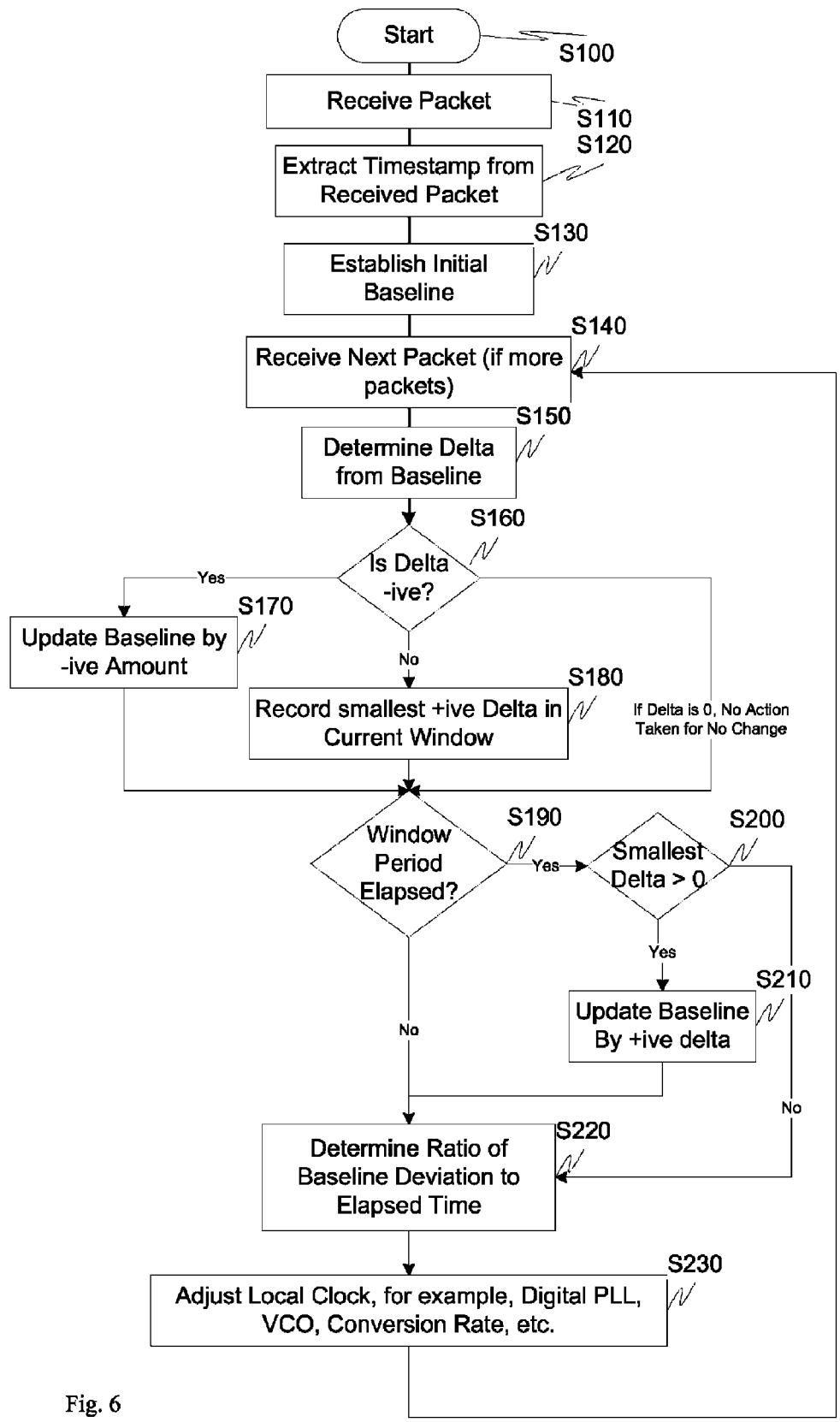
FIG. 6 illustrates an exemplary method for adjusting a clock according to this invention.

FIG. 6 illustrates an exemplary method for adjusting a local clock according to this invention. Iteratively this process can be generically summarized as:

(rtp_timestamp_of_this packet–rtp_timestamp_of-_prev_packet)–(local_time_of_arrival_of_this-_packet–local_time_of_arrival_of_prev_packet)

where "this" packet becomes "prev_packet" on the next iteration and "this_packet" is the latest received packet.

Control begins a step S100 and continues to step S110. In step S110, a first packet is received. Next, step S120, the time stamp from the received packet is extracted. Then, in step S130, an initial baseline is established. Control then continues to step S140.

In step S140, the next packet is received, if there are more packets. Next, in step S150, the deviation, or delta, from the baseline is determined. Then, in step S160, a determination is made whether the delta is negative. If the delta is negative, control continues to step S170 where the baseline is updated by the negative amount. If the delta is positive, smallest positive delta in the current window is recorded in step S180. If the delta is zero, no action is taken and no change needs to be made. Control then continues to step S190.

In step S190, a determination is made whether the window period has elapsed. If the window period has not elapsed, control jumps to step S220. Otherwise, control continues to step S200.

In step S200, a determination is made as to whether the smallest delta greater than zero. If the smallest delta is greater than zero, the baseline is updated by the positive delta in step S210. Otherwise, control jumps to step S220.

In step S220, a ratio of the baseline deviation to elapsed time is determined. Control then continues to step S230 where a local clock, such as a digital PLL, VCO, conversion rate, or the like, is updated.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such a telephone, mobile phone, PDA, a wired and/or wireless wide/local area network system, a satellite communication system, or the like, or on a separate programmed general purpose computer having a communications device(s) or in conjunction with any compatible communications protocol(s).

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems and methods for clock management. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A clock adjustment method comprising:
   receiving a first packet;
   extracting an RTP (Real-Time Transport Protocol) timestamp from the first packet;
   establishing an initial baseline based on the first packet;
   receiving a next packet;
   determining a delta from the baseline and iteratively performing the receiving of the next packet and determining steps to determine the delta from the baseline, wherein if the delta is a negative amount indicating a clock at the receiver is slower than a clock at a sender of the packets, immediately updating the baseline by the negative amount, and if the delta is not a negative amount, recording a smallest positive delta in a current window, wherein if a window period has elapsed and the smallest delta is greater than zero, the baseline is updated by a positive amount; and
   determining a ratio of baseline deviation to elapsed time, wherein the clock adjustment method removes short-term jitter and retains long-term drift.

2. The method of claim 1, further comprising adjusting a clock based on the delta.

3. The method of claim 2, wherein the adjusting includes updating the baseline by a positive or a negative amount.

4. The method of claim 2, where the adjusting includes recording a positive delta in a current window.

5. The method of claim 2, wherein the adjusting includes taking no action for a zero value delta.

6. The method of claim 1, further comprising, if a window period has elapsed, updating the baseline by the smallest delta greater than zero.

7. The method of claim 1, further comprising determining a ratio of baseline deviation to elapsed time.

8. The method of claim 1, wherein the clock at the receiver is a local clock, a digital PLL (Phase-Locked Loop), a VCO (Voltage Controlled Oscillator) or a conversion rate.

9. The method of claim 1, wherein the delta is positive or negative.

10. The method of claim 1, wherein the delta is zero.

11. A clock adjustment system comprising:
    a device that receives a first packet;
    a clock management module that extracts an RTP (Real-Time Transport Protocol) timestamp from the first packet and establishes an initial baseline based on the first packet, and upon receiving a next packet, determines a delta from the baseline, and iteratively performs the receiving of the next packet and determining steps to determine the delta from the baseline, wherein if the delta is a negative amount indicating a clock at the receiver is slower than a clock at a sender of the packets, immediately updating the baseline by the negative amount, and if the delta is not a negative amount, recording a smallest positive delta in a current window, wherein if a window period has elapsed and the smallest delta is greater than zero, the baseline is updated by a positive amount., and determines a ratio of baseline deviation to elapsed time, wherein the clock adjustment system removes short-term jitter and retains long-term drift.

12. The system of claim 11, wherein the clock management module adjusts a clock based on the delta.

13. The system of claim 12, wherein the adjusting includes updating the baseline by a positive or a negative amount.

14. The system of claim 12, where the adjusting includes recording a positive delta in a current window.

15. The system of claim 12, wherein the adjusting includes taking no action for a zero value delta.

16. The system of claim 11, wherein, if a window period has elapsed, the clock management module updates the baseline by the smallest delta greater than zero.

17. The system of claim 11, wherein the clock management module determines a ratio of baseline deviation to elapsed time.

18. The system of claim 11, wherein the clock at the receiver is a local clock, a digital PLL (Phase-Locked Loop), a VCO (Voltage Controlled Oscillator) or a conversion rate.

19. The system of claim 11, wherein the delta is positive or negative.

20. The system of claim 11, wherein the delta is zero.

21. A clock adjustment means comprising:
    means for receiving a first packet;
    means for extracting an RTP (Real-Time Transport Protocol) timestamp from the first packet;
    means for establishing an initial baseline based on the first packet;
    means for receiving a next packet; and
    means for determining a delta from the baseline and iteratively performing the receiving of the next packet and determining steps to determine the delta from the baseline wherein if the delta is a negative amount indicating a clock at the receiver is slower than a clock at a sender of the packets, immediately updating the baseline by the negative amount, and if the delta is not a negative amount, recording a smallest positive delta in a current window, wherein if a window period has elapsed and the smallest delta is greater than zero, the baseline is updated by a positive amount; and
    means for determining a ratio of baseline deviation to elapsed time, wherein the clock adjustment means removes short-term jitter and retains long-term drift.

22. The means of claim 21, further comprising means for adjusting a clock based on the delta.

23. A non-transitory computer readable media including instructions that, when executed by a processor, cause to be performed:
    receiving a first packet;
    extracting an RTP (Real-Time Transport Protocol) timestamp from the first packet;
    establishing an initial baseline based on the first packet;
    receiving a next packet; and determining a delta from the baseline and iteratively performing the receiving of the next packet and determining steps to determine the delta from the baseline wherein if the delta is a negative amount indicating a clock at the receiver is slower than a clock at a sender of the packets, immediately updating the baseline by the negative amount, and if the delta is not a negative amount, recording a smallest positive delta in a current window, wherein if a window period has elapsed and the smallest delta is greater than zero, the baseline is updated by a positive amount; and determining a ratio of baseline deviation to elapsed time, wherein the clock adjustment steps remove short-term jitter and retains long-term drift.

* * * * *

UNITED STATES PATENT AND TRADEMARK OFFICE
CERTIFICATE OF CORRECTION

| | | |
|---|---|---|
| PATENT NO. | : 7,936,794 B2 | Page 1 of 1 |
| APPLICATION NO. | : 11/835203 | |
| DATED | : May 3, 2011 | |
| INVENTOR(S) | : Lee D. Gibbons et al. | |

It is certified that error appears in the above-identified patent and that said Letters Patent is hereby corrected as shown below:

At Column 8, line 13, please delete "amount.," and replace it with --amount,-- therein.

Signed and Sealed this
Twenty-sixth Day of February, 2013

Teresa Stanek Rea
*Acting Director of the United States Patent and Trademark Office*